United States Patent
Hansen et al.

(10) Patent No.: US 6,763,760 B2
(45) Date of Patent: Jul. 20, 2004

(54) MACHINE FOR INJECTING LIQUIDS

(76) Inventors: Conly L. Hansen, 1310 East 3100 North, North Logan, UT (US) 84341; Ed Watts, 1332 East 3100 North, North Logan, UT (US) 84341

( * ) Notice: Subject to any disclaimer, the term of this patent is extended or adjusted under 35 U.S.C. 154(b) by 0 days.

(21) Appl. No.: 09/899,492

(22) Filed: Jul. 3, 2001

(65) Prior Publication Data

US 2003/0005831 A1 Jan. 9, 2003

(51) Int. Cl.[7] .............................. A23C 17/00; A23L 1/31
(52) U.S. Cl. ............................. 99/487; 99/533; 99/535
(58) Field of Search ......................... 99/487, 494, 534, 99/533, 532, 535, 450.7; 452/62, 57, 66; 426/281, 323, 574, 641

(56) References Cited

U.S. PATENT DOCUMENTS

| | | | |
|---|---|---|---|
| 3,016,004 A | | 1/1962 | Harper, Jr. et al. |
| 3,438,230 A | | 4/1969 | Harper, Jr. et al. |
| 3,649,299 A | | 3/1972 | Sholl |
| 3,661,072 A | * | 5/1972 | Allinquant et al. ............ 99/535 |
| 3,739,713 A | | 6/1973 | Kudale et al. |
| 3,769,037 A | | 10/1973 | Sholl |
| 3,814,007 A | | 6/1974 | Lumby et al. |
| 3,922,357 A | * | 11/1975 | Townsend .................... 99/535 |
| 5,053,237 A | | 10/1991 | Hendricks et al. |
| 5,071,666 A | * | 12/1991 | Handel et al. ............. 99/533 X |
| 5,176,071 A | * | 1/1993 | Klaassen ..................... 99/533 |
| 5,200,223 A | | 4/1993 | Simonsen |
| 5,366,746 A | | 11/1994 | Mendenhall |
| 5,460,842 A | | 10/1995 | Morgan |
| 5,470,597 A | | 11/1995 | Mendenhall |
| 5,472,725 A | | 12/1995 | Mendenhall |
| 6,014,926 A | * | 1/2000 | Tanaka et al. ................ 99/487 |
| 6,165,528 A | | 12/2000 | Tanaka et al. |
| 6,386,099 B1 | * | 5/2002 | Otsuka et al. ................ 99/487 |

OTHER PUBLICATIONS

H. J. Lee, N. F. Olson and D. B. Lund, High Pressure Injection of Fluids into Cheese, Process Biocvhemistry, Dec. 1978, pp. 14–18.

* cited by examiner

*Primary Examiner*—Reginald L. Alexander
(74) *Attorney, Agent, or Firm*—Reinhart Beerner Van Deuren s.c.

(57) ABSTRACT

A machine for injecting liquids. An air booster pump is adapted to receive injectate. The air booster pump is in fluid communication with one or more heads having apertures for nozzles. A hollow tube is preferably, but not necessarily, located within each head and is in fluid communication with the air booster pump. Injectate flows from the air booster pump into the head, preferably through the apertures in the wall of the hollow tube. Preferably, but not necessarily, the head is designed so that upon installation one point of the inside of the head will be at the highest elevation. Near such point the head has an escape aperture so that any gas within the injectate that enters the head will tend to flow to and through such escape aperture. Furthermore, a return line preferably, but not necessarily, takes injectate that flows through the escape aperture to the low-pressure side of the air booster pump. And also, a drain, in a work surface to which the head is preferably, but not necessarily, mounted, preferably, but not necessarily, reclaims injectate and transports it to the low-pressure side of the air booster pump. Filters exist for the injectate; a main injectate filter can preferably be replaced while the Machine is operating. And the Machine preferably includes a computer device for controlling its components and operation.

6 Claims, 7 Drawing Sheets

FIG. 2

NO RECYCLE
ONE RESERVOIR

FIG. 3

RECYCLE
ONE RESERVOIR

FIG. 4

RECYCLE
TWO RESERVOIRS

MACHINE FOR INJECTING LIQUIDS

BACKGROUND OF THE INVENTION

1. Field of the Invention

This invention relates to a machine for injecting liquids into materials having the consistency of foodstuffs.

2. Description of the Related Art

U.S. Pat. No. 5,053,237 of Deloy G. Hendricks and Conly L. Hansen provides an apparatus for the needleless injection of injectate into meat.

According to lines 33 through 40 in column 4 of that patent, "[A] nozzle injection apparatus causes the injectate to travel from a reservoir under pressure through a valve and out of a nozzle. Sufficient pressure must be provided such that the injectate can travel completely through the cut of met, if desired. At the same time, temperature controls must be provided so that the injectate leaves the nozzle at a temperature within a desired temperature range."

Lines 41 through 48 of column 6 and lines 3 through 26 of column 7 consistently explain:

" . . . The injection apparatus 10 will, in most cases, include a temperature control feature, such as a water bath 12, for controlling the temperature of the fluid to be injected ("injectate"). The actual injectate fluid will be contained within reservoir 14 disposed within the confines of water bath 12. It is crucial that the temperature be controlled within certain ranges in order to provide for proper injection.

"The apparatus of the present invention also includes a pump 16 and an adjustable relief valve 18 or pressure control assembly. Thus, the injectate can be pumped in a controlled manner from the reservoir through a nozzle assembly 20.

"Also useful in the present apparatus is an electric solenoid valve 22, which may be placed in communication with an adjustable timer to control duration of the bursts of injectate. Thus, the volume of injectate can be carefully controlled as can the amount of injectate which leaves the system. This apparatus can then be connected to a starter and relay to operate the valve 22.

"The injection apparatus will include a nozzle assembly 20. The nozzle assembly will function to direct the injectate in the proper direction and to maintain the stream of injectate at the proper volume. The nozzle assembly 20 may include a plurality of individual nozzles 24.

"The various components of the apparatus are placed in fluid communication by lines including recycle line 26, a feed line 28, and reservoir line 30.

"Finally, the apparatus illustrated in FIG. 9 includes an injection table 32 to provide support for the meat being injected."

U.S. Pat. No. 6,165,528 of Yoshihiko Tanaka et al. discloses another apparatus for the needleless injection of injectate into meat, which it terms a "pickle injector." This patent asserts, on line 66 of column 9 through line 8 of column 10:

"The pickle injector of the invention is a device for injecting the liquid substance into the green meat. The pickle injector is provided with a high-pressure liquid generator, a liquid-substance injecting section, and a pressure controller which can control the injection pressure while injecting the liquid substance when the liquid substance is injected from the injecting section to the green meat."

"The high-pressure liquid generator in the pickle injector the invention may be any mechanism, as long as it can increase the pressure of the liquid substance to a high level . . ."

No recognition is given in U.S. Pat. No. 6,165,528 is given to the fact that the injectate will be heated by passing through the pump and the pressure controller; nor is there any discussion concerning reclaiming injectate that does not find its way into the meat.

The apparatus of U.S. Pat. No. 6,165,528 does, however, preferably employ a manifold, as described in line 33 through 60 of column 10:

" . . . the high-pressure liquid substance is transferred from the high-pressure liquid generator via the high-pressure piping to the injecting section, and it is preferable to use the injecting section which has a member called a manifold for branching a single flow from the high-pressure piping to plural flows. The manifold is preferably placed on the tip end of the injecting section, but can be placed midway in the piping as the case may be.

"The injecting section of the conventional high-pressure liquid generator is of a single-hole type or has a form in which the piping in the manifold is branched radially. The present inventors have manufactured a manifold especially suitable for a pickle injector for meat, and a piping in the manifold is branched and the branched pipes are parallelly arranged. Here, the parallel arrangement includes not only the arrangement where the pipes are arranged parallel in a row but also the arrangement where the pipes are arranged zigzag or parallel in multiple rows. By arranging nozzles parallel, a nozzle interval can be narrowed to 10 mm or less, e.g., 5.6 mm for injection. Therefore, a highly dense and uniform injection is feasible. Further preferably used is a manifold which has multiple coherent stream injection nozzles arranged parallel in this manner.

"When the manifold is used, the high-pressure liquid substance is injected as the coherent stream from the nozzle on the tip end of each piping. The liquid substance is injected simultaneously from the parallel arranged nozzles to the green meat. . . . "

Subsequently, U.S. Pat. No. 6,165,528 explains, in lines 44 through 47 of column 17, " The liquid substance is injected as a coherent stream from the tip end of the injection nozzle of the manifold 7 in contact with the green meat." Thus, the nozzle actually touches the meat, creating an increased risk of contamination.

In lines 42 through 45 of column 18, similar language describes another embodiment. Also for this other embodiment, however, lines 34 through line 36 of column 18 indicate, "The manifold 7 is . . . lowered from above to hit against the green meat."

Although in lines 10 through 11 of column 17 and in line 16 of column 18, U.S. Pat. No. 6,165,528 states that high-pressure piping 6 is "constituted of a flexible hose," no purpose is given for this flexibility. Thus, it is logical to assume that the flexibility is for the traditional purpose in high-pressure lines, viz., absorbing forces associated with the pressure that could damage a more rigid line.

Finally, in its Description of the Related Art, U.S. Pat. No. 6,165,528 provides a summary of needleless injectors and related devices.

To the best of the inventors' knowledge, all previous needleless injectors have utilized pumps, such as positive displacement pumps, which must run continuously in order to maintain the fluid to be used as an injectate under constant high pressure. Heat generated by such continuous operation is transferred to the injectate as it passes through the pump.

Moreover, in the practical implementation of U.S. Pat. No. 5,053,237, once the pressure in the system reached the desired level, a pressure relief valve 18 would prevent the continuously running pump 16 from further raising the pressure. This was accomplished by allowing the injectate to flow from the pump 16, through the pressure relief valve 18, and back to the reservoir 14 that supplied the pump 16 with injectate. A solenoid valve 22 allowed the injectate to flow to the nozzles 24 of the nozzle assembly 20 when desired. The re-circulation of the injectate through the continuously running pump 16 tended to raise the temperature of the injectate even more.

Not only is a cooling system necessary to keep the injectate within the required temperature range, but the added volume in plumbing necessary to provide the recycling and the additional capacity within the reservoir 14 to account for the injectate that is being cooled within the water bath 12 requires a greater quantity of injectate than would otherwise be necessary. This, in turn, mandated the use of a larger pump 16. More energy was required both because of the larger capacity of the pump 16 and because of the continuous operation. And since injectate is purged when it is desired to use another fluid as the injectate, the cost of injectate was higher.

SUMMARY OF THE INVENTION

The present inventors recognized the preceding disadvantages of the systems in the prior art and developed a needleless injection apparatus that utilizes one or more commercially available air booster pumps. Such a pump generates less heat by operating only when necessary to maintain a desired pressure.

The Machine also employs a head which preferably, but not necessarily, has injectate introduced into the head through apertures in the walls of a hollow tube inside the head that is in fluid communication with the air booster pump. The head has apertures for one or more nozzles. The apertures are preferably, but not necessarily, designed so that an input end of the nozzle lies within the head at a point with enough distance to the interior of the wall of the head that any particles within the injectate will tend to fall to a level below the input end of the nozzle and not enter and thereby clog the nozzle.

The head is preferably, but not necessarily, designed so that upon installation one point of the inside of the head will be at substantially the highest elevation. Near such point the head has an escape aperture so that any gas within the injectate that enters the head will tend to flow to and through such escape aperture. Furthermore, a return line preferably, but not necessarily, takes injectate that flows through the escape aperture to the low-pressure side of the air booster pump. And also, a drain, in a work surface to which the head is preferably, but not necessarily, mounted, preferably, but not necessarily, reclaims injectate and transports it to the low-pressure side of the air booster pump.

In order to improve performance of the Machine and minimize outgassing from the injectate, either the source of the injectate is pressurized or a pump is inserted between the source and the air booster pump.

Preferably, but not necessarily, a main injectate filter is located between the source of the injectate and the air booster pump; and, preferably, but not necessarily, the design of the Machine permits this main injectate filter can be replaced while the Machine is operating.

A cleaning aperture is preferably, but not necessarily, located in each end of the head.

A conveyor belt is preferably, but not necessarily, in a work surface to which the head or heads are, preferably, but not necessarily, mounted and has an endless belt containing apertures so that the head or heads can be mounted either above or below the conveyor belt. The conveyor belt is preferably, but not necessarily, one which may operate at different speeds.

Ozone may be added by the Machine to the injectate or applied to the subject of the injection.

And a computer device preferably, but not necessarily, controls many of the components and functions of the Machine.

DESCRIPTION OF THE PREFERRED EMBODIMENT

The present invention is a needleless injection apparatus that utilizes one or more commercially available air booster pumps which employs relatively low-pressure compressed air (typically less than 150 psi) to generate an output pressure sufficiently intense to propel injectate efficiently and without imparting any substantial heat to the injectate. Rather than operating continuously to maintain a desired pressure, the air booster pump stops once that pressure has been attained. Each air booster pump is connected to one or more heads. And preferably, but not necessarily, control valve in a feed line going from the high-pressure side of the air booster pump to one or more heads opens to allow injectate on the high-pressure side of the air booster pump to flow through the nozzle or nozzles of the one or more heads. When this occurs, the pressure is lowered, and the air booster pump operates only long enough to re-establish the desired pressure.

Preferably, but not necessarily, the control valve is capable of directing injectate from the air booster pump to the specific head or heads which a user wishes to provide injection; alternately, however, a separate valve is located between the air booster pump and each head supplied with injectate by that air booster pump 32 so that a user may determine which heads 34 will be used for injection.

Alternatively, in lieu of either the control valve 36 or the separate valve between the air booster pump 32 and each head 34 supplied with injectate by that air booster pump, a separate pilot valve activates, deactivates, and controls the pressure provided by a given air booster pump 32.

The air booster pump 32 holds only a small quantity of injectate and preferably, but not necessarily, receives such injectate from a nearby supply reservoir 46, minimizing the total quantity of injectate that must be within the machine.

Each head 34, itself, has a number of unique features.

The head 34 is a hollow body having apertures 48 near the bottom into which one or more nozzles 42 may be releasably connected. Each nozzle 42 has an input end and an output end. Preferably, but not necessarily, the input end lies within the head 34 at a point with enough distance to the interior of the wall of the head 34 that any particles that may be within the injectate will tend to fall to a level below the input end of the nozzle 42 and, therefore, be unlikely to enter and clog the nozzle 42.

The interior diameter of the nozzles 42 is preferably, but not necessarily, selected to be such that surface tension of a liquid injectate will preclude the injectate from passing through a nozzle 42 unless the air booster pump 32 has pressurized the injectate above atmospheric pressure. This diameter is preferably less than 0.025 inch.

Within the head 34 is, preferably, but not necessarily, located a hollow tube 52 which communicates with the feed line 38 from the air booster pump 32 so that any injectate entering the head 34 must do so through the tube 52. Multiple apertures exist in the wall of the tube 52 that is perpendicular to the longitudinal access of the tube; preferably there is an aperture in the vicinity of each nozzle 42 in order to tend to equalize the pressure of the injectate at each nozzle 42. Introduction of the injectate into a head 34 at multiple locations, rather than from a single location, tends to increase turbulence within the injectate inside the head 34 and, therefore, to minimize the tendency of any particles within the injectate to accumulate and block a nozzle 42.

Again preferably, but not necessarily, a filter is located between the feed line 38 and any nozzle 42 associated with that head 34. When the hollow tube 52 is employed, such hollow tube 52 communicates with such aperture; and the hollow tube 52, preferably, but not necessarily, has, as the filter, a screen which removably surrounds the wall of the hollow tube 52 that is parallel to the longitudinal access of the hollow tube 52.

The head 34 is preferably, but not necessarily, designed so that upon installation one point of the inside of the head 34 will be at substantially the highest elevation. Near such point the head 34 has an escape aperture 60 so that any gas within the injectate that enters the head 34 will tend to flow to and through such escape aperture 60. Removal of gas from the injectate within the head 34 is important because, although liquid injectate is essentially incompressible, gas can be compressed; so, when the air booster pump 32 stops, injectate would not be forced through any nozzle 42 by the air booster pump 32 but would be by any entrapped, expanding compressed gas.

A return line 62 is preferably, but not necessarily, attached to the escape aperture 60 in order to return any liquid injectate that is forced through the escape aperture 60 by entrapped, compressed gas to the reservoir 46.

Preferably, but not necessarily, the feed line 38 and the return line 62 are flexible in order to facilitate moving the head or heads to alternate locations. The feed line 38 and the return line 62 could, however, be inflexible.

Preferably, but not necessarily, a valve 64 is located in the escape aperture 60 (or the return line 62). This valve 64 may be a manually operated valve but is preferably an electronically actuated valve.

Each head 34 is preferably, but not necessarily, mounted to a surface termed the "work surface," 66 which is preferably, but not necessarily, the top of a cabinet. Preferably, but not necessarily, the mounting is such that the head 34 may be rotated about one or more axes and preferably about three orthogonal axes. This is accomplished through any means that is well known in the art, such as by securing the head with a clamp that can be opened and then closed or loosened and then tightened. Additionally, it is preferable to have the height of the head above the work surface adjustable. Again, this is accomplished through any means that is well known in the art, such as mounting the clamps on a bracket that can be raised or lowered, e.g., with a hydraulic cylinder or a rotatable screw.

When there are multiple, independently orientable heads 34, a variety of optional techniques for injection exist. For example, injection can occur from multiple directions simultaneously or in timed succession; the angle of entry for the injection from one or more heads 34 can be changed simultaneously or in timed succession; offsetting forces of two or more injection heads 34 can be utilized to stabilize the position of the subject of the injection, precluding or minimizing the movement of the subject that can be caused when injection occurs from a single direction; and the pattern of injection produced by the nozzles 42 of different heads 34 can be overlapped to achieve a higher injection density at one time than could be obtained by using just one head 34, because of physical limitations dictating the space required between adjacent nozzles 42.

Figure 6:
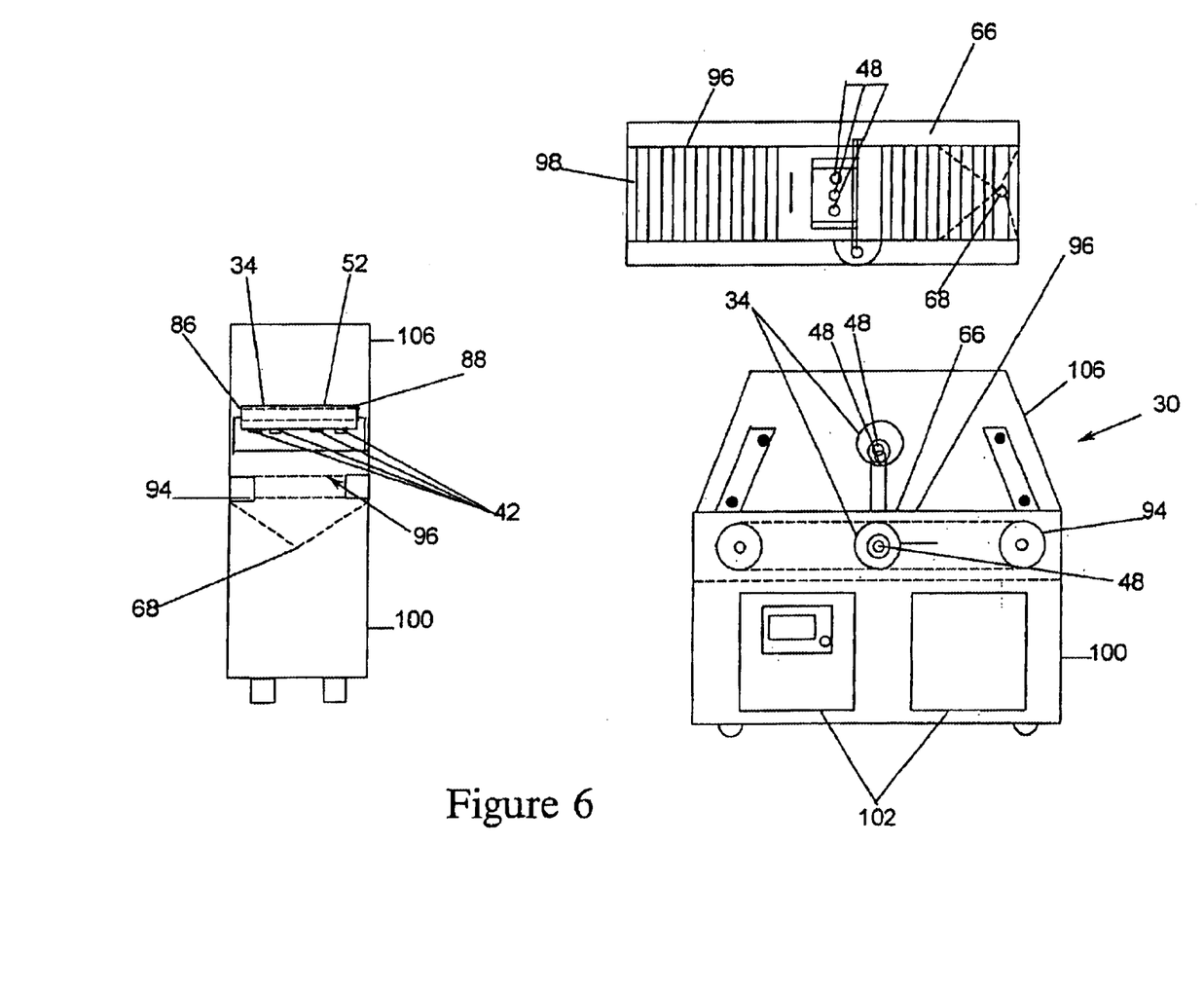
FIG. 6 shows the exterior of the Machine for Injecting Liquids in an embodiment having a drain.
Figure 7:
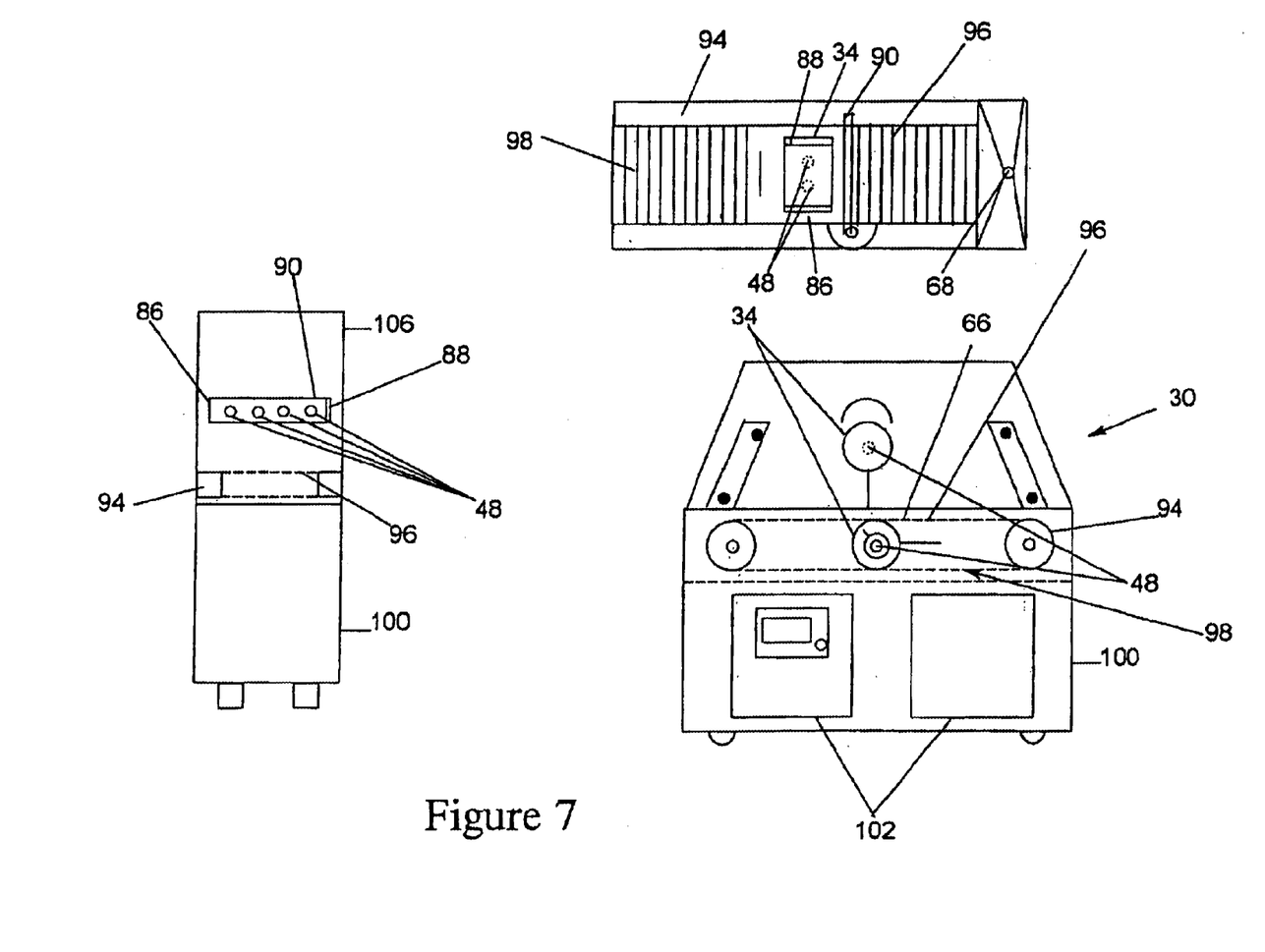
FIG. 7 illustrates the exterior of the Machine for Injecting Liquids in an embodiment having a catch basin in conjunction with the drain.

The top of the work surface 66, which, as noted above, is preferably, but not necessarily, the top of a cabinet, is preferably, but not necessarily, sloped to collect excess injectate and use gravity to cause it to flow through a drain 68 and preferably, but not necessarily, a screen. The screen can be upstream from the drain 68 or within the drain 68. Optionally, instead of just relying upon gravity, a reclamation pump could be placed in or adjacent to, and in fluid communication with, the drain 68. And the drain 68 optionally could include a catch basin into which injectate reclaimed from the work surface 66 would first flow.

There exist a variety of options for providing injectate to the air booster pump 32. Of course, a source 44 of injectate is connected to and in fluid communication with the input side 70 of the air booster pump 32.

Preferably, but not necessarily, a filter 72 designated the main injectate filter is located between the source of injectate 44 and the air booster pump 32, especially if pre-filtered injectate is not used.

Figure 1:
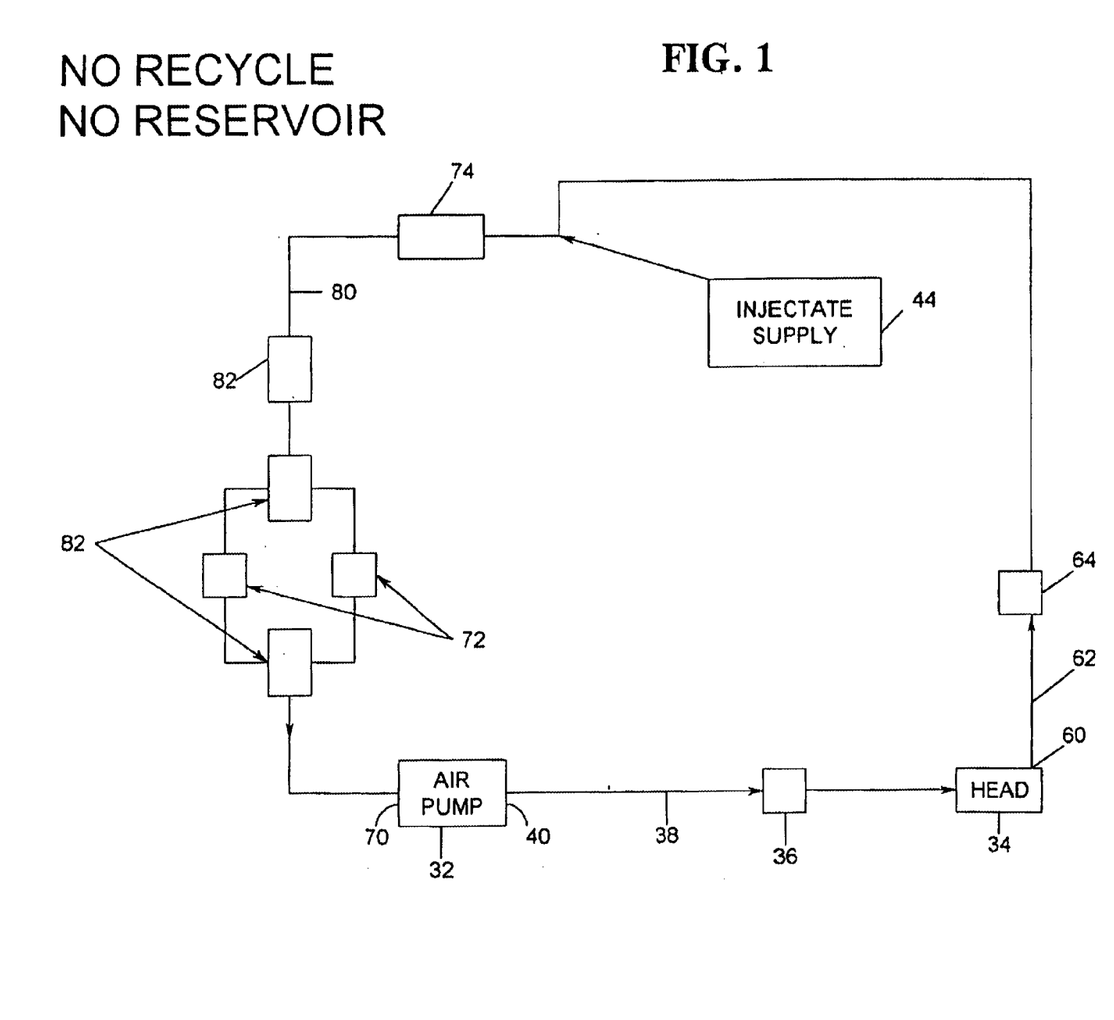
FIG. 1 represents in schematic form the Machine for Injecting Liquids in an embodiment with no reservoir and no recycling of injectate.
Figure 2:
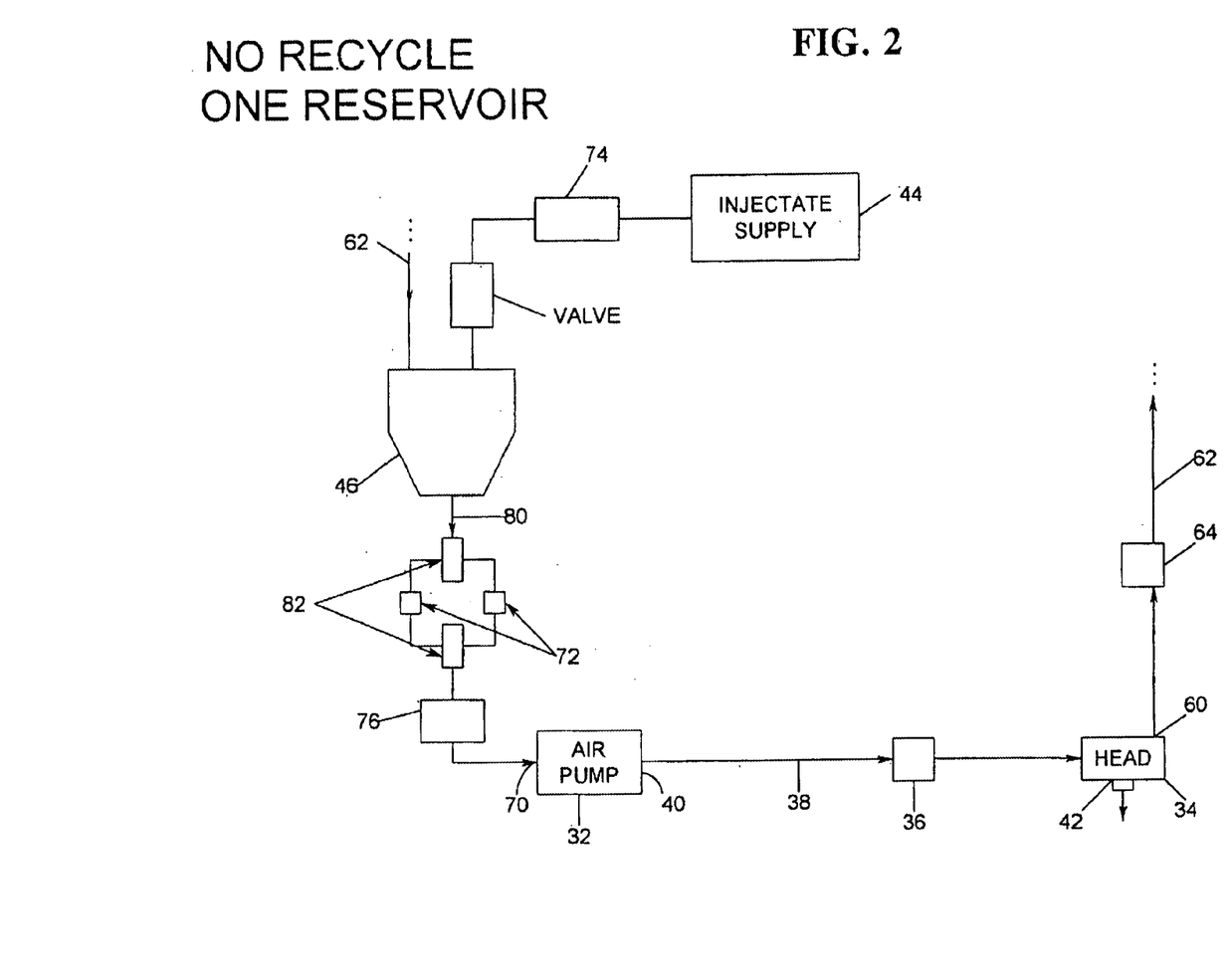
FIG. 2 represents in schematic form the Machine for Injecting Liquids in an embodiment with one reservoir but no recycling of injectate.

If it is not desired to have a return line 62 from the head 34 and if it is not desired to reclaim injectate from the work surface 66, either a container in which the injectate is delivered or a reservoir 46 into which the injectate is placed can serve as the source 44 of injectate. Gravity can cause the injectate to flow from the source to the air booster pump 32. Preferably, but not necessarily, however, either the source is pressurized, by any means 74 that is well known in the art, with gas to cause the injectate to flow or a pump 76 is inserted between the source and the air booster pump 32. This improves performance of the Machine for Injecting Liquids 30 and tends to preclude outgassing from the injectate which is caused when the air booster pump 32, in the absence of a pressurized source 74 or a pump 76 between the source and the air booster pump 32, creates a vacuum on its low-pressure side 70.

Figure 3:
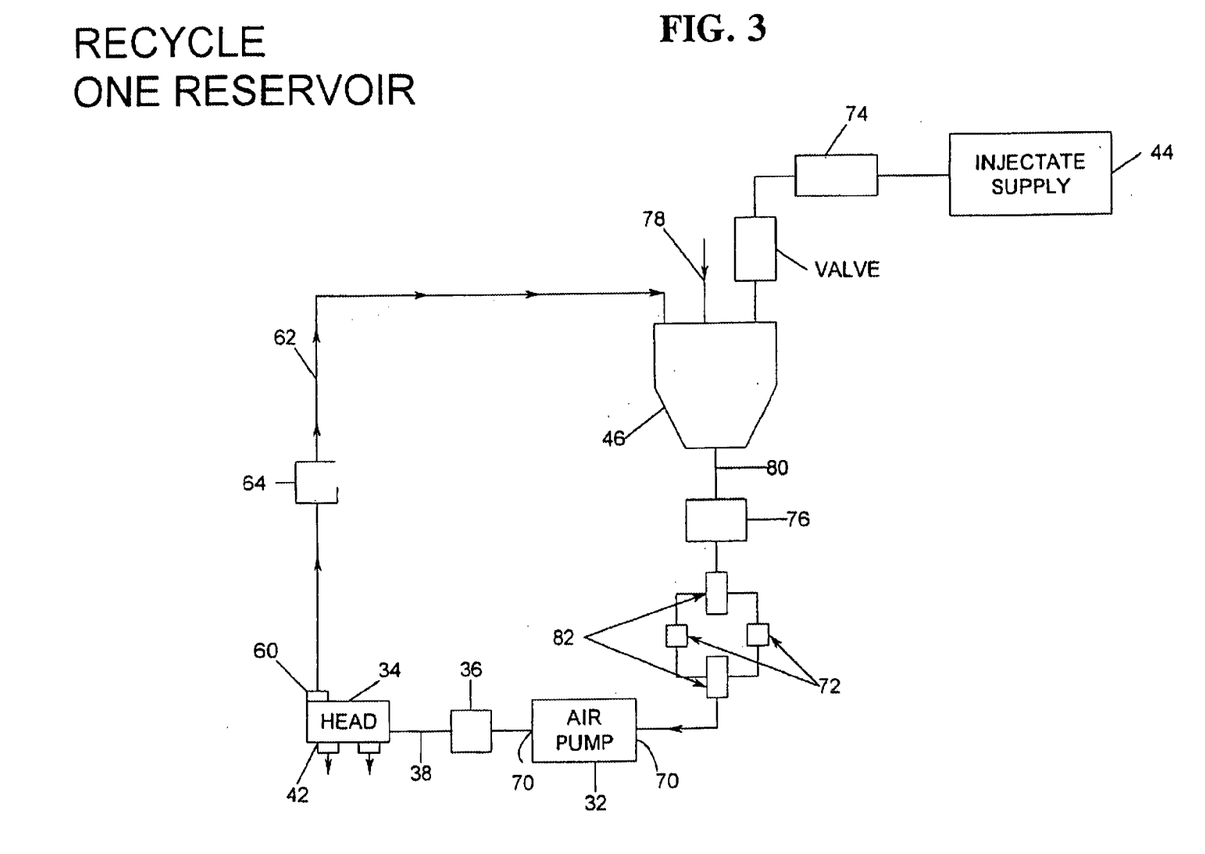
FIG. 3 represents in schematic form the Machine for Injecting Liquids in an embodiment with one reservoir and recycling of injectate.

When a pump 76 is inserted between the source and the air booster pump 32 and when there is a return line 62 or a drain 68 from the work surface 66 or both the return line 62 and the drain 68, it is preferable, but not necessary, to have the return line 62 and the drain 68 flow into the container or the reservoir 46, whichever serves as the source 44. In this case, were the source pressurized, check valves could be employed in the return line 62 and the drain line 78, in any manner that is well known in the art; but the reclamation pump would have to provide flow from the drain line 78. And, as a further alternative when the reclamation pump stimulates flow from the drain line 78, a line from the source could combine with the return line 62 and the drain line 78 utilizing check valves in any manner that is well known in the art with the combined line proceeding to the pump 76 between the source and the air booster 32 if such a pump 76 is employed and otherwise going to the low-pressure side 70 of the air booster pump 32.

It is further preferable, but not necessary, to have the ability to remove the main injectate filter 72 while the Machine 30 is still operating. This would permit the main injectate filter 72 to be cleaned or replaced without interfering with production.

Figure 4:
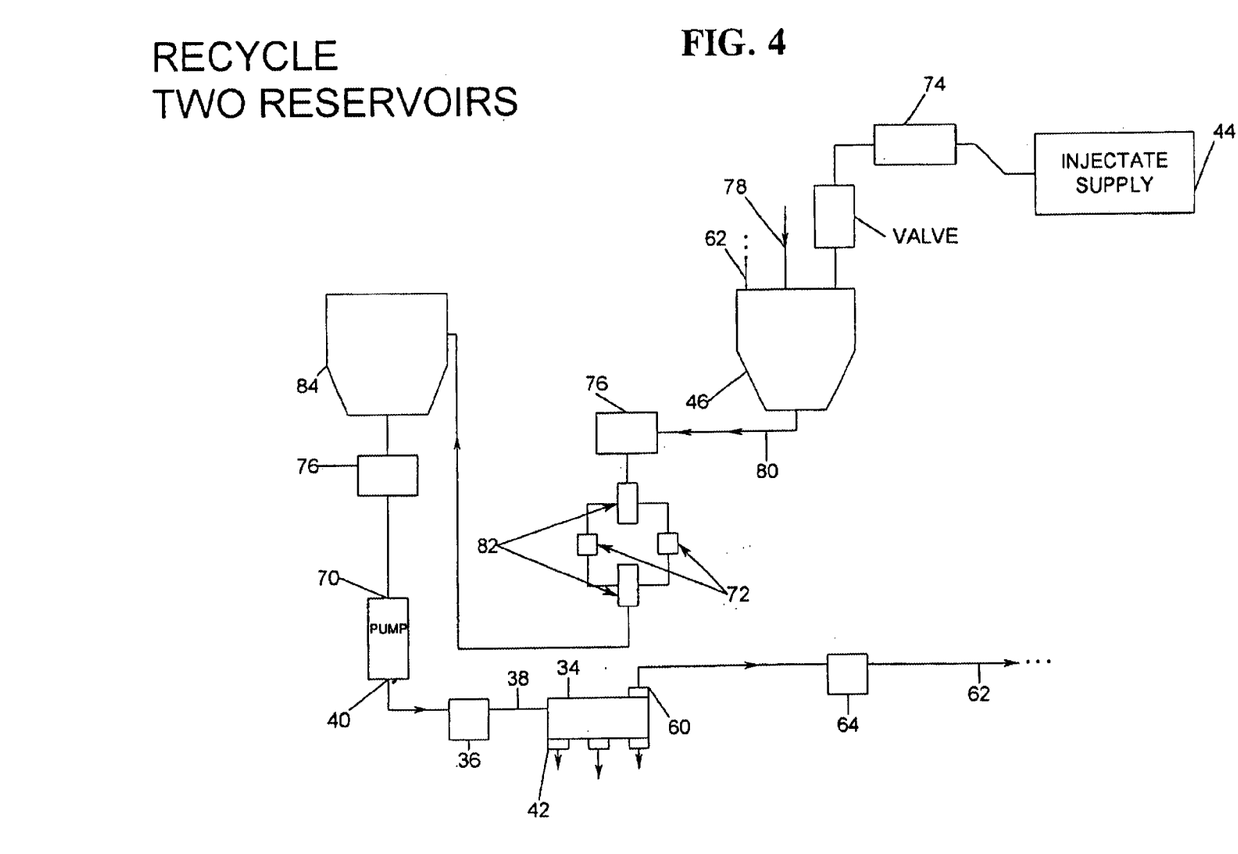
FIG. 4 represents in schematic form the Machine for Injecting Liquids in an embodiment with two reservoirs and recycling of injectate.

One example of a structure for accomplishing this is to have a line 80 from the source that branched into two parallel lines, each having a main injectate filter 72. A valve at the point of branching or on-off valves 82 in each parallel line prior to the main injectate filter 72 select which parallel line will operate. The parallel lines could rejoin prior to or upon entering any pump. An alternate exemplary structure has an auxiliary reservoir 84 located downstream from the main injectate filter 72 prior to any pump. This permits the main injectate filter 72 to be removed when there is no injectate in the first reservoir 46 while sufficient injectate remains in the second reservoir 84 to supply the needs of the Machine 30 at least for the time that is required to replace the main injectate filter 72.

Each head 34, preferably, but not necessarily, has a first end 86 and a second end 88 as well as an aperture designated the "cleaning aperture," which is preferably, but not necessarily, located in either the first end 86 or the second end 88 of the head 34 or, most preferably, both ends 86 and 88 of the head 34. As its name implies, the cleaning aperture 90 facilitates cleaning of the head 34. A brush, a high-pressure flush, or a spray may be introduced to the inside of the head 34 through the cleaning aperture 90. The cleaning aperture 90 is closed preferably, but not necessarily, with a valve located within the cleaning aperture 90. This may be done cleaning aperture. Optionally, a cap designated the "end cap" is removably attached to the head 34 over the cleaning aperture 90. This may be done in any manner that is well known in the art, such as by having mating threads in the cleaning aperture 90 and on the end cap.

Within or adjacent to the top of the work surface 66 is, preferably, but not necessarily, located an endless-belt conveyor 94. The conveyor 94 moves subjects near the head or heads 34 so that such subjects can be injected.

Preferably, but not necessarily, the belt 96 of the conveyor contains apertures 98 so that a head or heads 34 can even be mounted below the belt 96 as well as above or substantially even with the belt 96.

Preferably, but not necessarily, the speed of the conveyor 94 is variable; movement of the conveyor 94 can be continuous or incremental; and the conveyor 94 employs electronic braking to insure that the conveyor 94 is stopped rapidly and completely when desired.

Although the Machine 30 can be operated manually, it preferably, but not necessarily, includes a computer device such as a programmable logic controller.

The computer device, thus, preferably utilizes programmable microprocessors and includes the traditional features of a computer, such as a memory.

The length of the injection burst, injection pressure, and the delay between bursts can be programmed into the computer device by a user, although optional default settings can be placed into the computer device at the factory. The computer device is preferably, but not necessarily, capable of storing multiple programs that can be used when desired. Preferably, but not necessarily, the length of the injection burst can be varied from no injection to a continuous injection.

The computer device, furthermore, is preferably, but not necessarily, capable of controlling the movement of the conveyor 94 and synchronizing such movement with the injection burst in order to select the desired effect of the injection. For example, the computer device can, preferably, but not necessarily, cause injection to occur only when the conveyor 94 is stopped and thereby create virtually unnoticeable points of entry for the injectate into the subject; or, alternatively, the computer device can cause injection to transpire while the conveyor 94 is moving to create a slit in the subject that will result in mechanical tenderizing when the subject is material such as meat.

Optionally, the computer device may also be interfaced with various sensors, such as a sensor that detects the thickness of the subject. A program in the computer device then adjusts one or more injection parameters to accomplish a pre-selected goal with regard to the subject, e.g., attainment of a selected concentration of injectate within the subject.

Additionally, all valves in the Machine, including but not limited to, the valve in the cleaning aperture 90 and the valve in the escape aperture 60 can preferably, but not necessarily, be controlled by the computer device. When this is done for the valve in the escape aperture 60, the computer device is preferably, but not necessarily, programmed to open the valve in the escape aperture 60 for a specified duration after a specified number of injections. Experience with the Machine 30m will enable a user successfully to predict the rate of accumulation of gas and, therefore, the manner of injections after which the valve in the escape aperture 60 should be opened as well as the duration for such opening, although again default settings can be placed into the computer at the factory. Alternatively, the computer device can be programmed with algorithms based upon formulae that are well known in the art to calculate the theoretical pressure anywhere on the high-pressure side 40 of the air booster pump 32, e.g., in the feed line 38. A pressure sensor then measures the actual pressure. The computer device is programmed to compare the actual and theoretical pressures. Since air within the portions of the Machine 30 that are in fluid communication on the high-pressure side 40 of the air booster pump 32 is generally responsible for the actual pressure being lower than the theoretical pressure,the computer device is programmed with a range below the theoretical pressure within which the actual pressure must be. The computer device is father programmed to actuate, i.e., open, the valve in the escape aperture 60 one or more times until the actual pressure has risen so that it is above the lower limit of the acceptable pressure range. And in a still further option when the electronically actuated valve is employed in the escape aperture 60, a sensor is located in the head 34 near or, preferably, in the escape aperture 60. This sensor may be any sensor that is capable of distinguishing between liquid and gas, such as an optical sensor or a pressure sensor. The sensor is connected to the electronically actuated valve and causes the electronically actuated valve to be in the open position whenever gas is detected by the sensor.

Also, when there are multiple heads 34, some or all of the parameters can, preferably, but not necessarily, be varied independently for each head 34. This may be done with or without a computer device, but it is more practical employ a computer device for such purpose.

Preferably, but not necessarily, input by the user to the computer device is accomplished with a sealed touch panel because this can withstand a wet environment. Any other input device that can withstand a moist environment is also acceptable. And any input device known in the art could be used if kept a sufficient distance from the moist environment associated with the Machine.

Preferably, but not necessarily, the mounting of each head 34 is accomplished with gears and motors that are well known in the art so that each head 34 is moved in three axes as well as raised and lowered using the motors and gears. Such motors and gears are preferably, but not necessarily sealed as are their connections to power, using any technique that is well known in the art, so that they will not be impaired by a moist environment. Also preferably, but not necessarily, using any technique that is well known in the art, such as wires, radio frequency communication, or infrared communication, such motors and gears are remotely controllable. As is well known in the art, this can be done directly through the input device, preferably, but not necessarily, a touch panel or through an input device and the computer.

All features of the Machine 30 except the work surface 66, the heads 34, the motors and gears, and the lines are preferably, but not necessarily, contained within a sealed cabinet 100. Moreover, as discussed above, the work surface 66 is preferably, but not necessarily, the top of a cabinet; and, in the preferred embodiment, this would be the sealed cabinet 100.

Anything which enters the sealed cabinet 100, e.g., wires or lines, such as a line to fill an non-pressurized reservoir, preferably, but not necessarily, enter through apertures which are sealed, preferably, but not necessarily, with rubber gaskets. For maintenance, one or more doors 102 preferably, but not necessarily, exist in the outer surface of the cabinet 100; but these doors 102 and the sealed cabinet 100 incorporate a seal, preferably, but not necessarily one or more gaskets, around the opening or openings formed when the door 102 is not closed.

Figure 5:
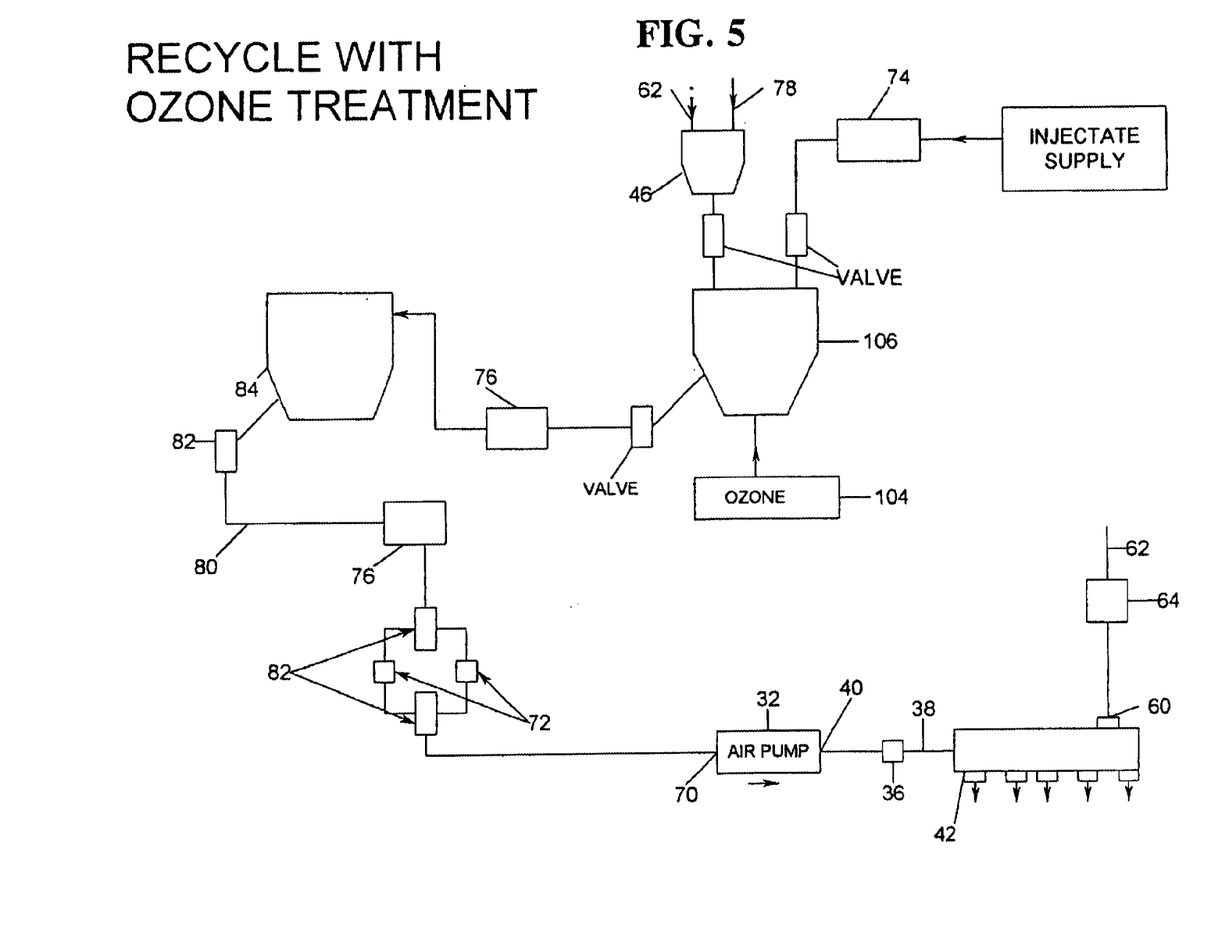
FIG. 5 represents in schematic form the Machine for Injecting Liquids in an embodiment with the capability of adding ozone to the injectate.

Optionally, in order to minimize the presence of microorganisms in the injectate, a source of ozone 104 is connected to a non-pressurized reservoir in any manner that is well known in the art. The ozone 104 is then allowed to bubble through the injectate in such reservoir. This may, for example, be accomplished by connecting the source of ozone 104 through a pressure regulator and valve to the reservoir near the bottom of such reservoir. And, as indicated above, this valve and, indeed, every valve associated with the Machine 30 are, preferably, but not necessarily controlled by the computer device.

Because the introduction of ozone 104 is somewhat consumptive of time, it is preferable, but not necessary, to have a non-pressurized reservoir in each of two parallel lines and to have one or more valves control which reservoir is receiving ozone and which is being used to supply injectate. This is done in a similar fashion as discussed above for the use of two main injectate filters.

Also, as discussed with respect to the main injectate filter, the two reservoirs could be in series with the upstream reservoir being used for introduction of ozone 104 into the injectate while the downstream reservoir supplies the operational needs of the Machine for injectate.

Similarly, the subject of injection is preferably, but not necessarily, treated with ozone 104 prior to injection. In the same manner as described above for the injectate, ozone 104 is bubbled through a water reservoir containing water. Then there are three options. The subject can be passed through the water reservoir, the water containing ozone can be transferred by any method that is well known in the art to a holding reservoir through which the subject is passed, or the water containing ozone can be sprayed on the subject by any method that is well known in the art.

Preferably, but not necessarily, any portion of the Machine 30 that will contact either the subject or the injectate must meet the food grade specifications that are well known in the art.

Also preferably, but not necessarily, a removable safety shield 106 covers the working surface 66 and heads 34 to such an extent that a user cannot touch the nozzles 42 or the stream of injectate.

Preferably, but not necessarily, this safety shield 106 is transparent. And preferably, but not necessarily, sensors or interlocks, in any manner that is well known in the art, determine when the safety shield 106 has been installed and preclude the Machine 30 from injecting whenever the safety shield has not been installed.

We claim:

1. A machine for injecting liquids, which comprises:
    an air booster pump adapted to receive injectate; and
    a head comprising a tubular wall and having apertures for nozzles, said head being in fluid communication with said air booster pump, and said tubular wall comprising a filter.

2. A device for injecting liquids into a subject, said device comprising:
    a reservoir for storing a fluid injectate, said reservoir having an inlet and an outlet;
    an air pump having an inlet and an outlet, said air pump in fluid communication with said reservoir;
    at least one injectate filter positioned between said outlet of said reservoir and said inlet of said air pump; and
    a head component, said head component comprising a tubular wall and having an inlet, spray apertures, and nozzles releasably connected to said spray apertures, said head component in fluid communication with said air pump, and said tubular wall comprising a filter, wherein said head component is arranged and configured such that said nozzles are spaced apart from the subject.

3. A device for injecting liquids into a subject, said device comprising:
    a reservoir for storing a fluid injectate, said reservoir having an inlet and an outlet;
    an air pump having Zn inlet and an outlet, said air pump in fluid communication with said reservoir;
    at least one injectate filter positioned between said outlet of said reservoir and said inlet of said air pump; and
    a head component, said head component having an inlet, spray apertures, an escape aperture, and nozzles releasably connected to said spray apertures, said head component in fluid communication with said air pump, wherein said head component is arranged and configured such that said nozzles are spaced apart from the subject.

4. The device of claim 3, further comprising a return line connected to said escape aperture, said return line in fluid communication with said reservoir.

5. The device of claim 3, further comprising:

a return line connected to said escape aperture; and a second reservoir, wherein said second reservoir is in fluid communication with said return line and said first reservoir.

6. A device for injecting liquids into a subject, said device comprising:

a reservoir for storing a fluid injectate, said reservoir having an inlet and an outlet;

a plurality of air pumps, each air pump having an inlet and an outlet, and each of said air pumps in fluid communication with said reservoir; and at least one injectate filter positioned between said outlet of said reservoir and said inlet of said air pump; and a plurality of head components, each said head components having an inlet, spray apertures, and nozzles releasably connected to said spray apertures, each of said head components in fluid communication with one of said air pumps, wherein said head component is arranged and configured such that said nozzles are spaced apart from the subject.

* * * * *

UNITED STATES PATENT AND TRADEMARK OFFICE
CERTIFICATE OF CORRECTION

PATENT NO. : 6,763,760 B2
DATED : July 20, 2004
INVENTOR(S) : Conly L. Hansen and Ed Watts It is certified that error appears in the above-identified patent and that said Letters Patent is hereby corrected as shown below:

Title page,
Item [56], References Cited, OTHER PUBLICATIONS,
"H.J. Lee," reference, "Biocvhemistry" should be -- Biochemistry --
Item [74], *Attorney, Agent or Firm*— "Beerner" should be -- Boerner --

Column 1,
Line 18, "met" should be -- meat --

Column 2,
Line 26, "and a piping" should be -- piping --

Column 4,
Lines 42 through 65, should be -- The present invention is a needleless injection apparatus 30 that utilizes one or more commercially available air booster pumps 32 which employs relatively low-pressure compressed air typically less than 150 psi) to generate an output pressure sufficiently intense to propel injectate efficiently and without imparting any substantial heat to the injectate. Rather than operating continuously to maintain a desired pressure, the air booster pump 32 stops once that pressure has been attained. Each air booster pump 32 is connected to one or more heads 34. And preferably, but not necessarily, control valve 36 in a feed line 38 going from the high-pressure side 40 of the air booster pump 32 to one or more heads 34 opens to allow injectate on the high-pressure side 40 of the air booster pump 32 to flow through the nozzle or nozzles 42 of the one or more heads 34. When this occurs, the pressure is lowered, and the air booster pump 32 operates only long enough to re-establish the desired pressure.

Preferably, but not necessarily, the control valve 36 is capable of directing injectate from the air booster pump 32 to the specific head or heads 34 which a user wishes to provide injection; alternately, however, a separate valve is located between the air booster pump 32 and each head 34 supplied with injectate by that air booster pump 32 so that a user may determine which heads 34 will be used for injection.

Alternatively, in lieu of either the control valve 36 or the separate valve between the air booster pump 32 and each head 34 supplied with injectate by that air booster pump 32, . . . --

Column 6,
Line 13, "surface adjustable" should be -- surface 66 adjustable --

Column 7,
Line 39, "aperature designated" should be -- aperature 90 designated --

UNITED STATES PATENT AND TRADEMARK OFFICE
CERTIFICATE OF CORRECTION

PATENT NO. : 6,763,760 B2
DATED : July 20, 2004
INVENTOR(S) : Conly L. Hansen and Ed Watts

It is certified that error appears in the above-identified patent and that said Letters Patent is hereby corrected as shown below:

Column 8,
Line 44, "30m" should be -- 30 --
Line 45, "manner" should be -- number --

Column 10,
Line 32, "shield" should be -- shield 106 --
Line 61, "Zn" should be -- an --

Signed and Sealed this

Eighth Day of February, 2005

JON W. DUDAS
*Director of the United States Patent and Trademark Office*